(12) United States Patent  (10) Patent No.: US 9,302,470 B1
Misaizu et al.  (45) Date of Patent: Apr. 5, 2016

(54) IMAGE FORMING APPARATUS, IMAGE PROCESSING DEVICE AND IMAGE FORMING METHOD

(71) Applicant: FUJI XEROX CO., LTD., Tokyo (JP)

(72) Inventors: Toru Misaizu, Yokohama (JP); Masayuki Kaneda, Yokohama (JP); Kenji Hara, Yokohama (JP); Hidetoshi Kawashima, Yokohama (JP); Kota Matsuo, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/679,548

(22) Filed: Apr. 6, 2015

(30) Foreign Application Priority Data

Sep. 22, 2014 (JP) ................................. 2014-193136

(51) Int. Cl.
*B41J 2/045* (2006.01)
(52) U.S. Cl.
CPC .......... *B41J 2/04535* (2013.01); *B41J 2/04586* (2013.01)

(58) Field of Classification Search
None
See application file for complete search history.

(56) References Cited

FOREIGN PATENT DOCUMENTS

JP 2003237059 A * 8/2003
JP 2006-293916 A 10/2006

OTHER PUBLICATIONS

Machine translation of JP 2003-237059 A. (JP 2003-237059 was published on Aug. 26, 2003.).*

* cited by examiner

*Primary Examiner* — Justin Seo
(74) *Attorney, Agent, or Firm* — Oliff PLC

(57) ABSTRACT

An image forming apparatus includes: an image forming unit that forms an image on a recording material by ejecting ink; and an image processing unit that, in a case where information of a bar code image is included in image information for forming an image by the image forming unit, carries out a process of making a drop size of the ink used for pixels constituting an edge portion in the bar code image smaller than a drop size of the ink used for pixels constituting a portion other than the edge portion.

6 Claims, 15 Drawing Sheets

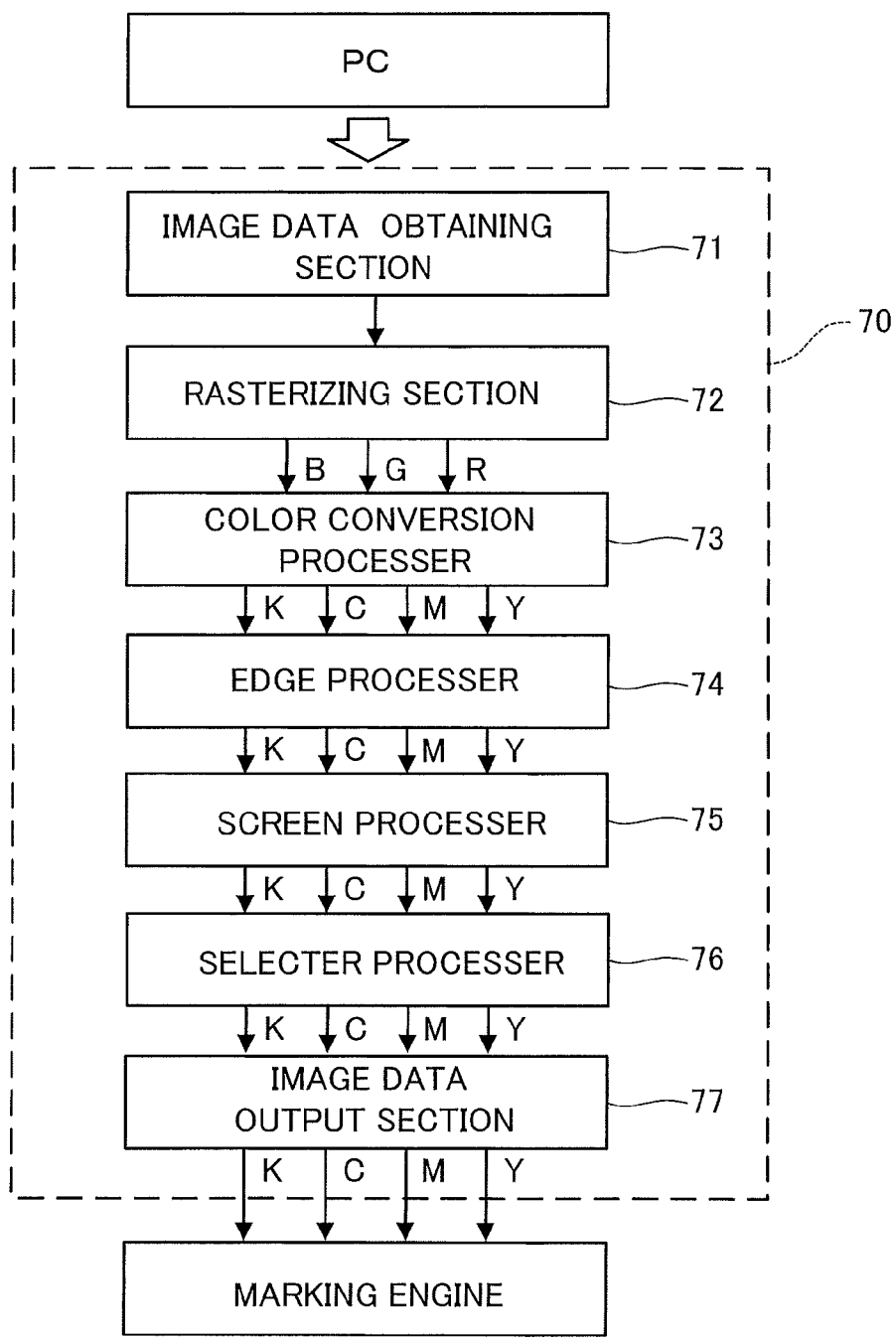

1 CHARACTER

LARGE DROP SIZE

FIG.6A

| 1 | 2 | 3 |
|---|---|---|
| 4 | 5 | 6 |
| 7 | 8 | 9 |

$Max(SH, SV, SR, SL) \geqq EETH$  ⋯ (5)

$Max(SH, SV, SR, SL) < EETH$  ⋯ (6)

FIG.7A

| 1 | 2 | 3 |
|---|---|---|
| 4 | 5 | 6 |
| 7 | 8 | 9 |

FIG.7B

| 1 | 2 | 3 |
|---|---|---|
| 4 | 5 | 6 |
| 7 | 8 | 9 |

FIG.7C

| 1 | 2 | 3 |
|---|---|---|
| 4 | 5 | 6 |
| 7 | 8 | 9 |

FIG.7D

| 1 | 2 | 3 |
|---|---|---|
| 4 | 5 | 6 |
| 7 | 8 | 9 |

FIG.9A BASIC DITHER MASK

| 86 | 33 | 98 | 180 | 69 | 45 | 118 | 84 |
|---|---|---|---|---|---|---|---|
| 201 | 145 | 225 | 24 | 217 | 159 | 14 | 245 |
| 49 | 191 | 102 | 63 | 133 | 36 | 211 | 139 |
| 126 | 12 | 122 | 255 | 173 | 195 | 82 | 46 |
| 176 | 238 | 57 | 116 | 1 | 74 | 231 | 146 |
| 42 | 206 | 151 | 220 | 166 | 204 | 23 | 114 |
| 18 | 78 | 94 | 36 | 51 | 88 | 128 | 193 |
| 197 | 161 | 227 | 139 | 186 | 247 | 153 | 11 |

FIG.9B SMALL DROP SIZE DITHER MASK

| 61 | 24 | 70 | 128 | 49 | 32 | 84 | 60 |
|---|---|---|---|---|---|---|---|
| 143 | 103 | 161 | 17 | 155 | 113 | 10 | 175 |
| 35 | 136 | 73 | 45 | 95 | 26 | 151 | 99 |
| 90 | 9 | 87 | 182 | 123 | 139 | 59 | 33 |
| 126 | 170 | 41 | 83 | 1 | 53 | 165 | 104 |
| 30 | 147 | 108 | 157 | 118 | 146 | 16 | 81 |
| 13 | 56 | 67 | 26 | 36 | 63 | 91 | 138 |
| 141 | 115 | 162 | 99 | 133 | 176 | 109 | 8 |

FIG.9C MIDDLE DROP SIZE DITHER MASK

| 197 | 188 | 199 | 212 | 194 | 190 | 202 | 196 |
|---|---|---|---|---|---|---|---|
| 216 | 206 | 220 | 186 | 219 | 209 | 184 | 223 |
| 190 | 214 | 199 | 193 | 204 | 188 | 218 | 205 |
| 203 | 184 | 203 | 225 | 211 | 215 | 196 | 190 |
| 212 | 222 | 192 | 202 | 182 | 194 | 221 | 207 |
| 189 | 217 | 207 | 219 | 210 | 216 | 186 | 201 |
| 185 | 195 | 198 | 188 | 191 | 197 | 204 | 215 |
| 215 | 209 | 220 | 205 | 213 | 224 | 208 | 184 |

FIG.9D LARGE DROP SIZE DITHER MASK

| 235 | 229 | 237 | 246 | 233 | 230 | 239 | 235 |
|---|---|---|---|---|---|---|---|
| 249 | 242 | 251 | 228 | 251 | 244 | 227 | 254 |
| 231 | 247 | 237 | 232 | 241 | 229 | 250 | 241 |
| 240 | 226 | 239 | 255 | 245 | 248 | 235 | 230 |
| 246 | 253 | 232 | 239 | 225 | 234 | 252 | 242 |
| 230 | 249 | 243 | 251 | 245 | 249 | 228 | 238 |
| 227 | 234 | 236 | 229 | 231 | 235 | 240 | 248 |
| 248 | 244 | 252 | 241 | 247 | 254 | 243 | 226 |

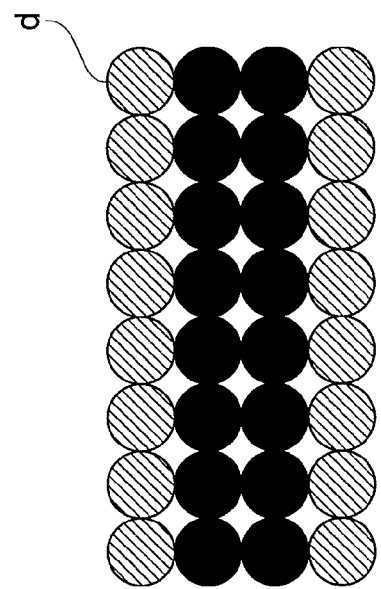
FIG.10A
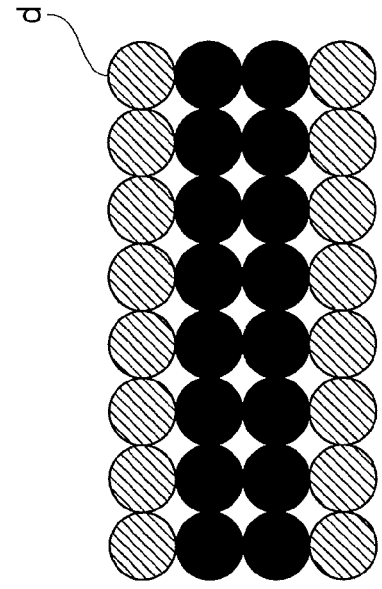
FIG.10B
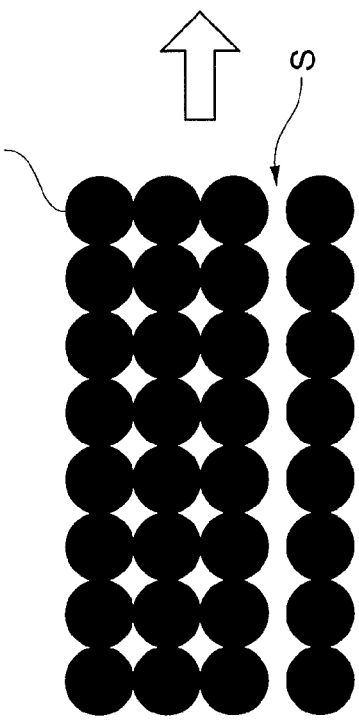
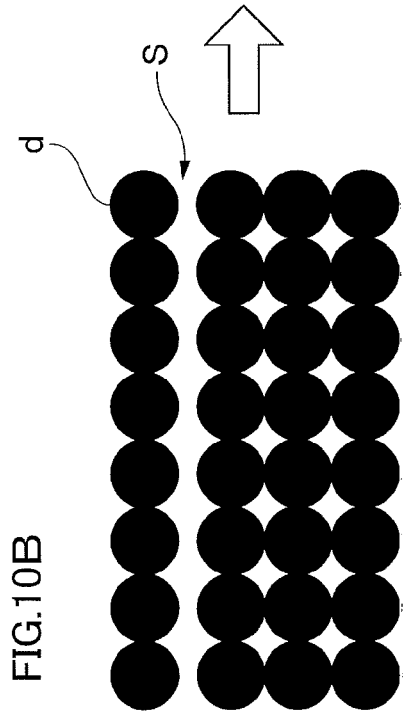
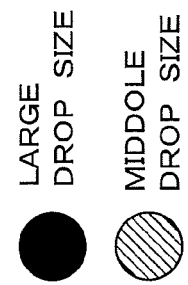
FIG.10C
● LARGE DROP SIZE
◐ MIDDOLE DROP SIZE

IMAGE FORMING APPARATUS, IMAGE PROCESSING DEVICE AND IMAGE FORMING METHOD

CROSS REFERENCE TO RELATED APPLICATION

This application is based on and claims priority under 35 USC §119 from Japanese Patent Application No. 2014-193136 filed Sep. 22, 2014.

BACKGROUND

1. Technical Field

The present invention relates to an image forming apparatus, an image processing device and an image forming method.

2. Related Art

For example, in an image forming apparatus, such as a copying machine or a printer using an ink-jet system, in some cases, an image is formed by an image forming unit after carrying out various kinds of image processing on inputted image information.

SUMMARY

According to an aspect of the present invention, there is provided an image forming apparatus including: an image forming unit that forms an image on a recording material by ejecting ink; and an image processing unit that, in a case where information of a bar code image is included in image information for forming an image by the image forming unit, carries out a process of making a drop size of the ink used for pixels constituting an edge portion in the bar code image smaller than a drop size of the ink used for pixels constituting a portion other than the edge portion.

BRIEF DESCRIPTION OF THE DRAWINGS

Exemplary embodiments of the present invention will be described in detail based on the following figures, wherein:

FIG. 2 is a block diagram showing a signal processing system in a controller of the image forming apparatus;

FIGS. 6A and 6B are diagrams showing a method of determining whether a pixel is an edge pixel or a non-edge pixel;

FIGS. 7A to 7D are diagrams illustrating orientation of an edge subjected to determination by an edge orientation determination section;

FIG. 9A is a diagram showing an example of a basic dither mask stored in a basic dither mask memory, and FIGS. 9B to 9D are diagrams each showing an example of dither mask generated by a dither mask generation section;

FIGS. 10A to 10C are diagrams showing changes between images to be formed in a case where the exemplary embodiment is not applied and in a case where the exemplary embodiment is applied;

DETAILED DESCRIPTION

Description of Overall Configuration of Image Forming Apparatus

Hereinafter, an exemplary embodiment according to the present invention will be described in detail with reference to attached drawings.

Figure 1:
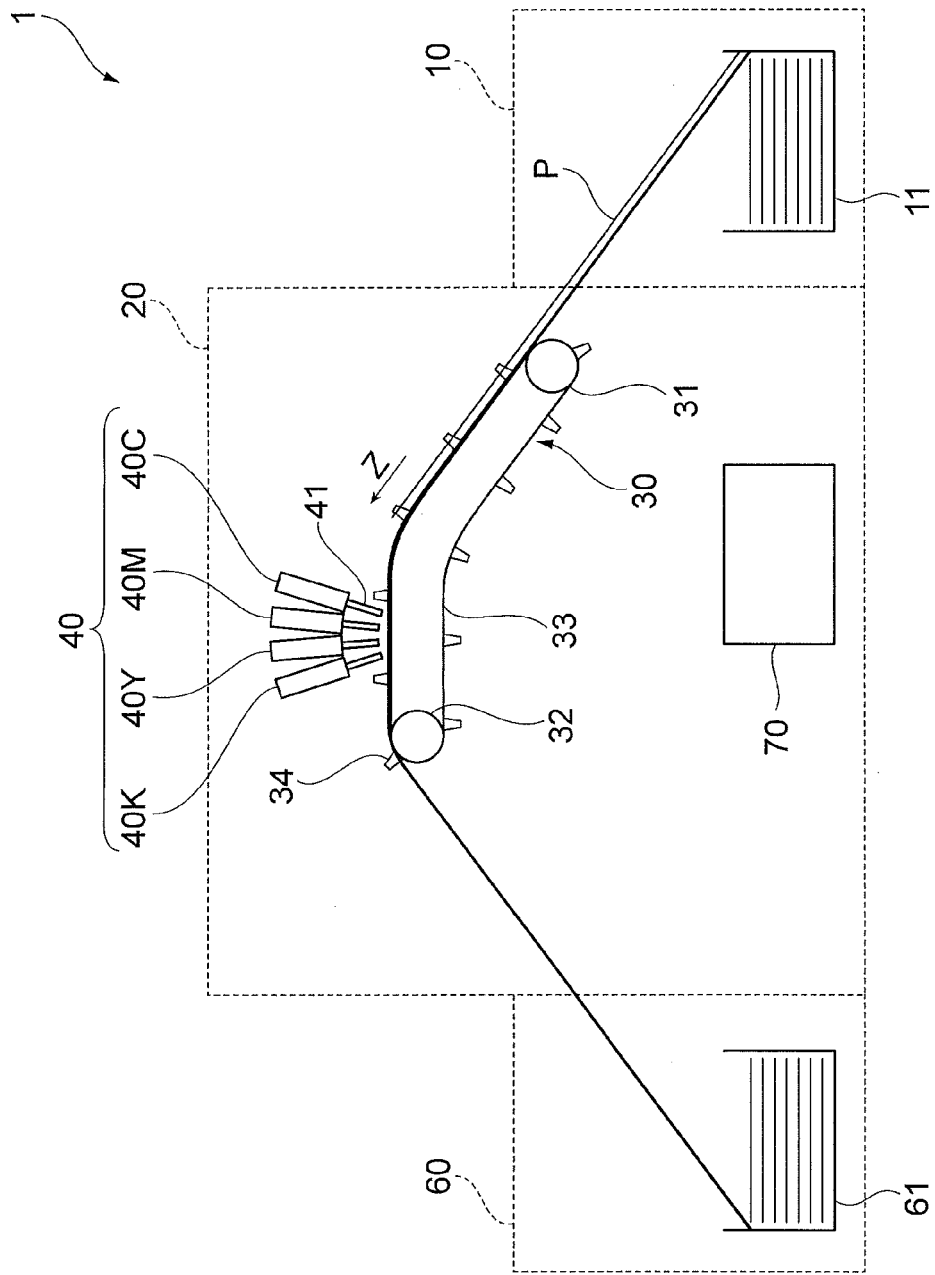
FIG. 1 is a diagram showing an overview of an image forming apparatus according to an exemplary embodiment.

FIG. 1 is a diagram showing an overview of an image forming apparatus 1 according to the exemplary embodiment.

The image forming apparatus 1 shown in the figure includes: a sheet feeder 10 that feeds a continuous sheet (a recording material, a recording medium) P in which each page is continuously formed in a sheet transport direction; an image forming section 20 as an example of an image forming unit that forms an image onto the continuous sheet P by ejecting ink; and an output section 60 that contains the continuous sheet P after the image is formed thereon.

The sheet feeder 10 includes a supply sheet container 11 that contains the continuous sheet P before forming the image thereon. On the continuous sheet P contained in the supply sheet container 11, perforations for dividing the pages each of which constitutes the continuous sheet P are formed. Moreover, in both end portions in the width direction of the continuous sheet P, sprocket holes, which are plural holes formed along the sheet transport direction, are formed at regular intervals. The supply sheet container 11 contains the continuous sheet P in a state of being folded into three fold with a printing surface facing outside (Z fold) along the perforations that are capable of being torn.

The image forming section 20 includes a tractor 30 that transports the continuous sheet P and an ink-jet head 40 that ejects ink onto the continuous sheet P to form an image. Moreover, the image forming section 20 includes a controller 70 as an example of an image processing device (image processing unit) that controls various functional sections, such as the tractor 30 and the ink-jet head 40, and carries out image processing.

The tractor 30 transports the continuous sheet P to supply thereof from the sheet feeder 10 to the ink-jet head 40 under the control by the controller 70. With the transportation, the continuous sheet P, on which image formation has been carried out by the ink-jet head 40, is successively contained by the output section 60.

Moreover, the tractor 30 includes: motors 31 and 32 that are provided on both end portions of the tractor 30 in the longitudinal direction; and a frame 33 that is rotated by the motors 31 and 32 as a driving source. Further, the tractor 30 includes tractor pins 34 for transporting the continuous sheet P. The tractor pins 34 are formed on both end portions in the width direction (a direction in the continuous sheet P that is orthogonal to the transport direction of the continuous sheet P) along the longitudinal direction of the frame 33 at predetermined intervals. These intervals are same as the intervals of the sprocket holes of the continuous sheet P provided in the sheet transport direction. Then, parts of the tractor pins 34 brought into contact with the continuous sheet P are inserted into the sprocket holes of the continuous sheet P, to thereby transport the continuous sheet P upon receiving a driving force from the motors 31 and 32.

The motors 31 and 32 are rotated in the counterclockwise direction in the figure at the normal time during which image formation is carried out. When the motors 31 and 32 are rotated in the counterclockwise direction, the frame 33 is rotated in the counterclockwise direction in the figure, and the tractor pins 34 are moved so as to transport the continuous sheet P toward the Z-direction in the figure. Accordingly, the continuous sheet P is transported from the sheet feeder 10 toward the image forming section 20, and also the continuous sheet P is successively transported from the image forming section 20 toward the output section 60.

The ink-jet head 40 is configured with ink-jet heads 40C, 40M, 40Y and 40K corresponding to ink of four colors, namely, cyan (C), magenta (M), yellow (Y) and black (K), respectively. The ink-jet head 40 carries out image formation onto the continuous sheet P by ejecting droplets of colored ink by known means, such as a thermal system or a piezoelectric system.

The ink-jet head 40 is provided to extend in the width direction of the continuous sheet P, and has, for example, a length corresponding to a maximum width of an image formation region, which is an ejection region of ink droplets in each page of the continuous sheet P. Moreover, in each of the ink-jet heads 40C, 40M, 40Y and 40K in the ink-jet head 40, nozzles 41 for ink ejection are arranged all over the width of the image formation region. When the nozzle 41 ejects ink, the ink adheres to a portion, of the continuous sheet P transported by the tractor 30, corresponding to an ink drop position, which is a position where the ink ejected by the nozzle 41 drops, to thereby form an image on the continuous sheet P.

Moreover, in the exemplary embodiment, a configuration of four colors, namely, C, M, Y and K is taken as an example; however, combinations of colors of ink or number of colors are not limited to the example, and a light-colored ink, a dark-colored ink or a special color ink may be added as required. For example, there is a configuration for adding an ink head to eject light-colored inks, such as light cyan and light magenta, and arrangement order of heads of respective colors is not particularly limited. Moreover, the ink-jet head 40 may be configured only with a monochrome ink.

It should be noted that the image forming apparatus 1 of the exemplary embodiment selects a drop size, which is an amount of the ink droplet, from a large drop size, a middle drop size and a small drop size for each and every pixel, and ejects the ink droplet of the selected size to adhere to the continuous sheet P, to thereby form an image. The drop size in the case of the large drop size is, for example, 12 pl (picoliter). Moreover, the drop size in the case of the middle drop size is, for example, 7 pl, and the drop size in the case of the small drop size is, for example, 3 pl.

<Description of Signal Processing System>

FIG. 2 is a block diagram showing a signal processing system in the controller 70 of the image forming apparatus 1.

It should be noted that, in FIG. 2, not only the signal processing system in the controller 70, but also a PC (a personal computer) as an external device of the image forming apparatus 1 and a marking engine that forms an image based on image signals processed by the signal processing system are shown together. The marking engine corresponds to, for example, the image forming section 20 that actually forms an image in the image forming apparatus 1 illustrated in FIG. 1. It should be noted that, here, an example that configures the image forming apparatus 1 as a printer is shown. Hereinafter, description will be given of a flow of image signal processing with reference to FIG. 2.

The controller 70 includes: an image data obtaining section 71 as an example of an image information obtaining section that obtains image data (image information) generated for outputting an image by the image forming apparatus 1; a rasterizing section 72 that generates a raster image from the image data; a color conversion processor 73 that converts RGB data into YMCK data; an edge processor 74 that carries out image processing, which will be described later, on the edge portions in the bar code image; a screen processor 75 that carries out screen processing; a selector processor 76 that selects a drop size of ink to be ejected; and an image data outputting section 77 that outputs image data that has been subjected to image processing.

In the exemplary embodiment, first, the image data obtaining section 71 receives image data from an external PC. The image data is print data which a user of the PC desires to print by the image forming apparatus 1.

The rasterizing section 72 rasterizes the image data obtained by the image data obtaining section 71 to convert thereof into raster data of each pixel, to thereby generate a raster image. Then, the rasterizing section 72 outputs the converted raster data as RGB (Red, Green and Blue) video data. At this time, the rasterizing section 72 outputs the RGB data for each page.

The color conversion processor 73 converts the RGB data inputted from the rasterizing section 72 into a device-independent color value, such as [XYZ], [L*a*b*] or [L*u*v*], and thereafter, converts the color value into the YMCK data, which corresponds to reproduction colors of the image forming apparatus 1 (colors of toner as the coloring materials, namely, yellow (Y), magenta (M), cyan (C) and black (K)), and outputs the YMCK data. The YMCK data is composed of Y-color data, M-color data, C-color data and K-color data separated for each color.

In a case where the bar code image data is included in the image data, the edge processor 74 carries out a process to reduce a drop size of ink to be used for pixels constituting the edge portions in the bar code image as compared to a drop size of ink to be used for pixels constituting the other portions.

The screen processor 75 carries out screen processing onto the image information by dither mask processing that uses a dither mask having predetermined threshold value arrangements in the fast scan direction and in the slow scan direction. This changes the image data, for example, from a multivalued representation to a binary representation.

The selector processor 76 is an example of a drop size selection section, and selects the drop size of ink to be ejected for each pixel from a large drop size, a middle drop size and a small drop size.

The edge processor 74, the screen processor 75 and the selector processor 76 will be described in more detail later.

The image data output section 77 outputs the image data that has been subjected to image processing, such as color conversion processing, to the marking engine.

Here, in the case where an image is formed by the image forming apparatus 1 shown in FIG. 1, an image of a bar code image is included in the image in some cases.

Figure 3A:
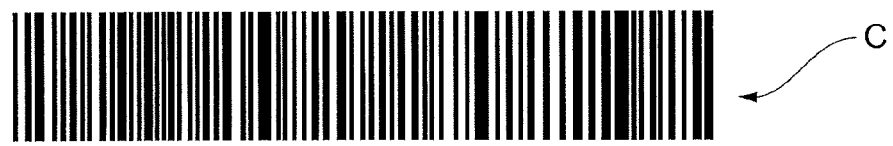
FIG. 3A is a diagram showing an example of a bar code image.

FIG. 3A is a diagram showing an example of an image of a bar code.

The bar code image C shown in the figure is a so-called one-dimensional bar code. The one-dimensional bar code is formed in the vertical direction in the figure, and is configured by arranging plural bars (modules or black bars), each having a predetermined line width, in the horizontal direction in the figure. In the bar code, various kinds of information, for example, a country code, a maker code, information about a product number of a product, customer information, a check digit and the like, is included.

Then, the bar code image C is read by a bar code reader or the like, and information included in the bar code is interpreted from a distance between the edges of the modules.

Figure 3B:
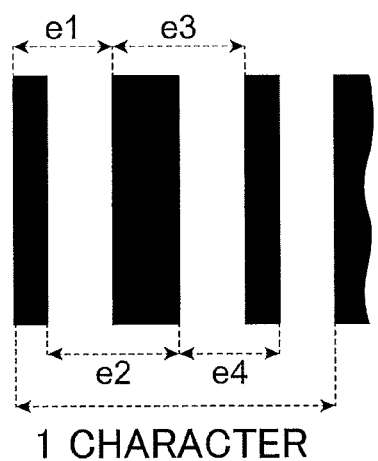
FIG. 3B is a diagram exemplifying a distance between edges of modules, which is used in reading a bar code.

FIG. 3B is a diagram exemplifying a distance between the edges of the modules, which is used in reading a bar code.

In this example, as shown in the figure, one character is interpreted by reading the widths of e1, e2, e3 and e4.

The reading accuracy of the bar code is determined by (i) the contrast ratio between the modules and blank portions (white bars) between the modules, (ii) the sum of the widths of the modules, and (iii) the distance between the edges of the modules shown in FIG. 3B.

However, when an image is formed by the image forming apparatus 1 shown in FIG. 1, in the case of carrying out high-speed printing (for example, sheet transport speed of 200 m/min), if continuous printing with ink of the large drop size lasts, supply of the ink becomes insufficient, and thereby defects such as line cracking are caused in some cases.

FIGS. 4A to 4D are diagrams illustrating line cracking. Here, a case of enlarging a module extending in the horizontal direction in the figure is shown. The module has a width corresponding to four dots as the line width (the width in the vertical direction in the figure). In other words, an image constituted by the module is formed by arranging four dots (pixels) d in the vertical direction in the figure.

Figure 4A:
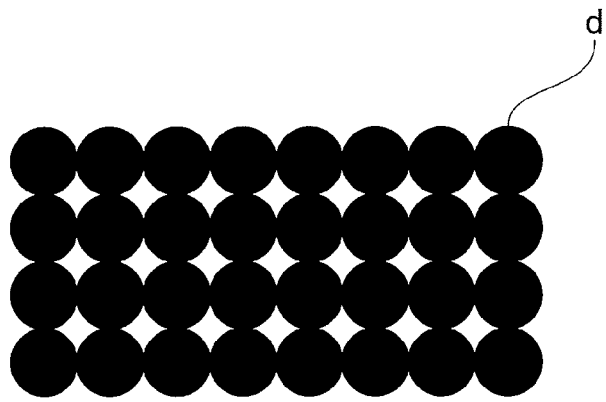
FIGS. 4A to 4D are diagrams illustrating line cracking.
Figure 4B:
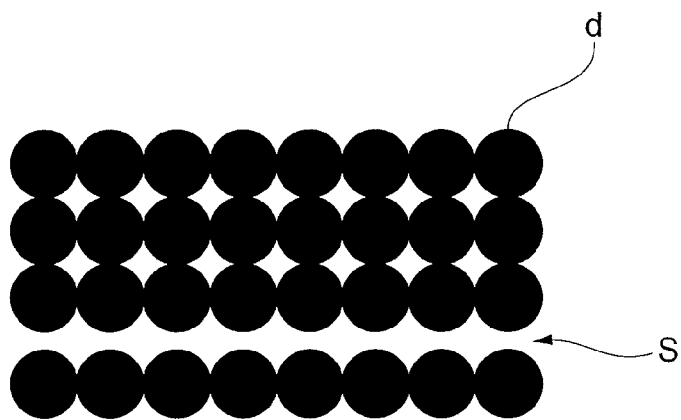
Figure 4C:
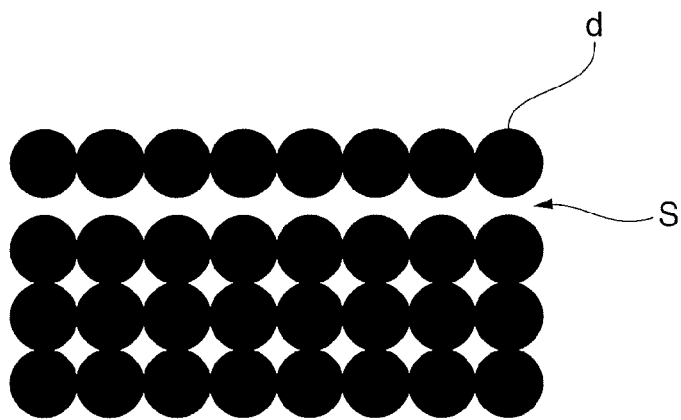
Figure 4D:

FIG. 4A shows an image of the module in a normal state, in which line cracking does not occur. In contrast, FIGS. 4B and 4C show images of the modules in a state in which line cracking occurs. In FIG. 4B, it is learned that the dots d arranged in the lowermost row are positioned apart from the dots d arranged in the other rows, to thereby generate a gap portion S. Moreover, in FIG. 4C, it is learned that the dots d arranged in the uppermost row are positioned apart from the dots d arranged in the other rows, to thereby generate a gap portion S. Generation of the gap portion S in this manner makes one module seem to be cracked.

This is a phenomenon caused by insufficiency of ink supply and instable ink ejection. Then, due to occurrence of line cracking like this, the module width or the distance between the edges of the modules is changed. As a result, the reading accuracy of the bar code is degraded.

To perform stable printing, printing may be carried out by the ink of the middle drop size or the small drop size, which is smaller drop size, on all over the printing surface. However, in this case, printing by the smaller drop size of ink causes insufficient contrast ratio, and as a result, the reading accuracy is degraded. That is, a problem with respect to the above-described (i) occurs.

Moreover, to avoid thickening of the line width caused by line cracking, there is a technique as a related art to adjust the line width in rasterizing. However, since the bar code module is a line having a specific width (for example, a line width which is a multiple of four dots), a change in the line width also degrades the reading accuracy of the bar code. Accordingly, it is not preferable to apply the related art.

As a consequence, in the exemplary embodiment, the edge processor 74, the screen processor 75 and the selector processor 76 are made to carry out the following processing to suppress occurrence of the problem.

<Description of Edge Processor>

Figure 5:
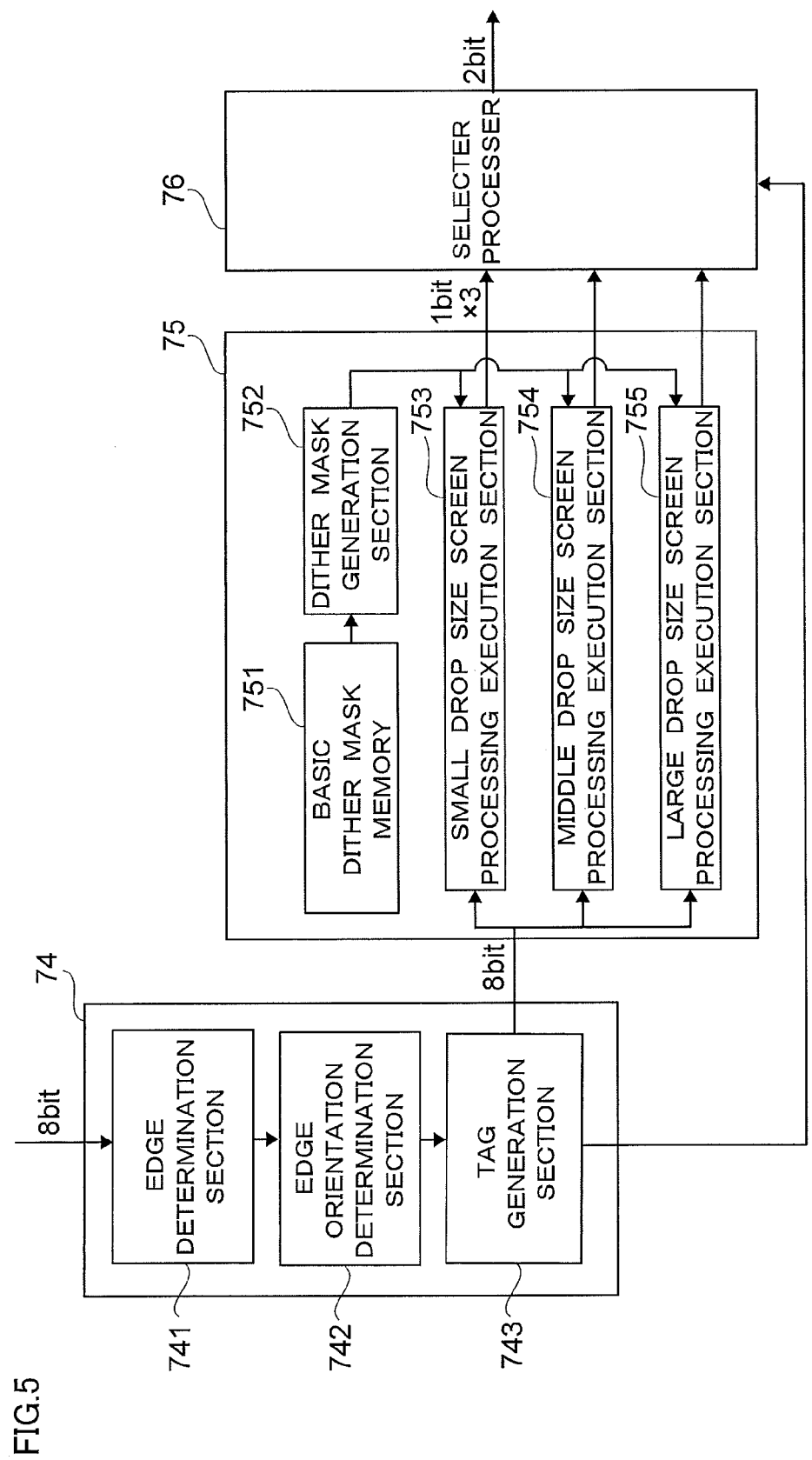
FIG. 5 is a block diagram illustrating an edge processor, a screen processor and a selector processor of the exemplary embodiment in more detail.

FIG. 5 is a block diagram illustrating the edge processor 74, the screen processor 75 and the selector processor 76 of the exemplary embodiment in more detail.

As shown in the figure, the edge processor 74 includes: an edge determination section 741 that determines whether or not a pixel constitutes an edge; an edge orientation determination section 742 that determines an orientation of an edge; and a tag generation section 743 that provides a tag to each pixel.

The edge determination section 741 determines whether each pixel in an image is a pixel constituting an edge (an edge pixel) or a pixel not constituting an edge (a non-edge pixel).

Determination whether a pixel is the edge pixel or the non-edge pixel is conducted as follows.

FIGS. 6A and 6B are diagrams showing the method of determining whether a pixel is the edge pixel or the non-edge pixel. Here, an example is shown, in which one of each pixel is selected as a target pixel and determination whether the target pixel is the edge pixel or the non-edge pixel is carried out.

In FIG. 6A, a window of 3 dots long and 3 dots wide is set with the target pixel being at a center. Here, the center pixel represented by "5" is the target pixel, and 8 pixels adjacent to the target pixel are represented by "1" to "4" and "6" to "9". Then, according to expressions (1) to (4) shown in FIG. 6B, values of SH, SV, SR and SL are calculated. It should be noted that, in expressions (1) to (4), numerals 1 to 9 are pixel values of the pixels represented by "1" to "9" in FIG. 6A, respectively. The pixel value is represented by, for example, 8-bit numeric value, and is an integral value of 0 to 255.

Then, as shown in expression (5), when the maximum value of SH, SV, SR and SL is not less than a predetermined threshold value EETH, the target pixel represented by "5" is the edge pixel. Moreover, as shown in expression (6), when the maximum value of SH, SV, SR and SL is less than the predetermined threshold value EETH, the target pixel represented by "5" is the non-edge pixel.

In other words, in the case where the target pixel represented by "5" is the edge pixel, the pixel values of the pixels sandwiching the target pixel are largely different. Moreover, in the case where the target pixel represented by "5" is the non-edge pixel, there is not much difference in the pixel values of the pixels sandwiching the target pixel. Since SH, SV, SR and SL are calculations of the difference in the pixel values between the pixels sandwiching the target pixel represented by "5", whether the target pixel represented by "5" is the edge pixel or the non-edge pixel is determined based on whether the difference is not less than the threshold value EETH or less than the threshold value EETH.

The edge orientation determination section 742 determines the orientation of the edge.

FIGS. 7A to 7D are diagrams illustrating orientation of an edge to be subjected to determination by the edge orientation determination section 742. It should be noted that, in the figure, it is assumed that the hatched pixels have pixel values larger than those of the white pixels.

FIG. 7A shows an example of the case in which the target pixel "5" is the edge pixel constituting the upper side of the edge. In this case, the maximum value of the SH, SV, SR and SL is SH, and the sum of the pixel values of "7" to "9" becomes larger than the sum of the pixel values of "1" to "3". That is, an inequality (1+2+3)<(7+8+9) holds. Accordingly, in this case, it can be determined that the target pixel "5" is the edge pixel constituting the upper side of the edge. It should be noted that, in the case where the target pixel is the edge pixel and the edge exists in the orientation as shown in FIG. 7A, hereinafter, the state of the target pixel is referred to as existing in "upper edge" in some cases.

FIG. 7B shows an example of the case in which the target pixel "5" is the edge pixel constituting the lower side of the edge. In this case, the maximum value of the SH, SV, SR and SL is SH, and the sum of the pixel values of "1" to "3" becomes larger than the sum of the pixel values of "7" to "9". That is, an inequality (1+2+3)>(7+8+9) holds. Accordingly, in this case, it can be determined that the target pixel "5" is the edge pixel constituting the lower side of the edge. It should be noted that, in the case where the target pixel is the edge pixel and the edge exists in the orientation as shown in FIG. 7B, hereinafter, the state of the target pixel is referred to as existing in "lower edge" in some cases.

FIG. 7C shows an example of the case in which the target pixel "5" is the edge pixel constituting the left side of the edge. Moreover, FIG. 7D shows an example of the case in which the target pixel "5" is the edge pixel constituting the right side of the edge. In this case, the maximum value of SH, SV, SR and SL becomes SV. It should be noted that, in the case where the target pixel is the edge pixel and the edge exists in the orientations as shown in FIG. 7C or 7D, hereinafter, the state of the target pixel is referred to as existing in "side edge" in some cases.

The edge orientation determination section 742 determines "upper edge", "lower edge" and "side edge" as the edge orientation as described above.

The tag generation section 743 generates a tag when the target pixel is the non-edge pixel, and in the case where the target pixel is the edge pixel, also generates a tag on the basis of the edge orientation being the upper edge, the lower edge or the side edge. For example, when the target pixel is the non-edge pixel, the tag "0" is provided. Moreover, when the target pixel is the edge pixel, the tag "1", "2" or "3" is provided in accordance with the edge orientation of "upper edge", "lower edge" or "side edge", respectively.

It should be noted that, when SR or SL becomes the maximum value, the edge orientation is regarded as any of "upper edge", "lower edge" and "side edge" according to the value of SH and SV.

<Description of Screen Processor>

Returning to FIG. 5, the screen processor 75 includes: a basic dither mask memory 751 that stores the basic dither mask; a dither mask generation section 752 that generates a dither mask from the basic dither mask; a small drop size screen processing execution section 753 that carries out screen processing for the small drop size; a middle drop size screen processing execution section 754 that carries out screen processing for the middle drop size; and a large drop size screen processing execution section 755 that carries out screen processing for the large drop size.

The basic dither mask memory 751 of the screen processor 75 stores the basic dither mask to be used by the screen processor 75. Then, the dither mask generation section 752 generates, from the basic dither mask, a small drop size dither mask used for the small drop size, a middle drop size dither mask used for the middle drop size and a large drop size dither mask used for the large drop size.

In the exemplary embodiment, two threshold values X1 and X2 are set for the pixel values of the image data inputted to the screen processor 75. In the case where the image data is 8-bit data composed of integral values of 0 to 255, for example, X1=182 and X2=225 are set as the threshold values, and the small drop size, the middle drop size and the large drop size are separately used as the ink to be ejected while marking boundaries with these threshold values.

Figure 8:
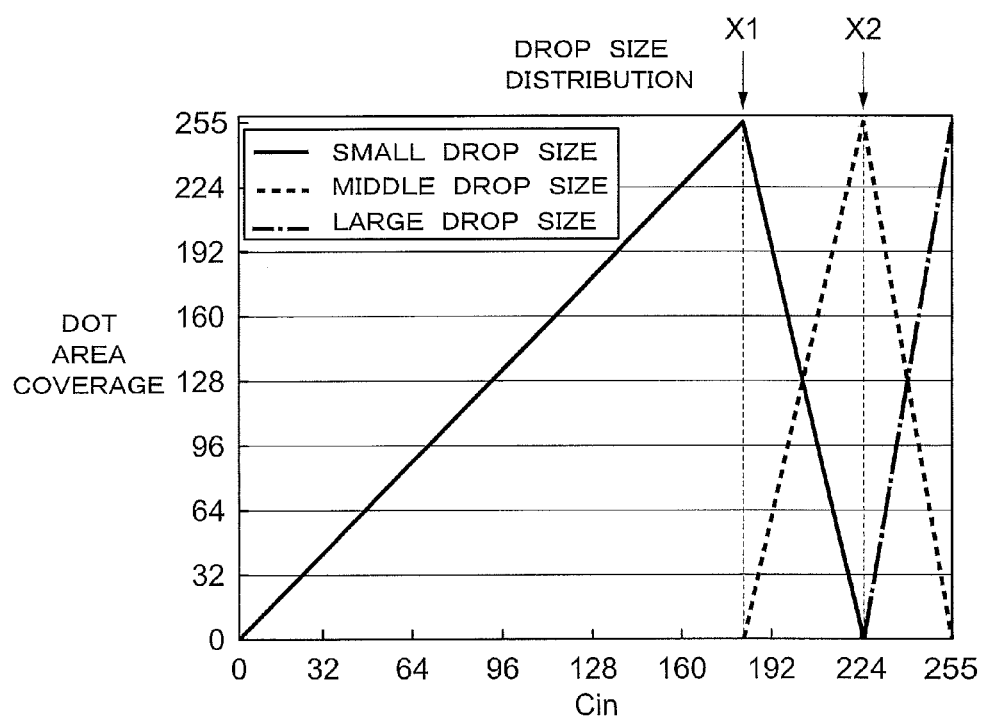
FIG. 8 is a diagram showing a relation between a pixel value of image data and a drop size.

FIG. 8 is a diagram showing a relation between a pixel value of the image data and a drop size. It should be noted that the edge pixel is subjected to the later-described process. The horizontal axis in FIG. 8 represents the pixel value (Cin) of the image data, and the vertical axis represents dot area coverage.

In the case where the pixel value (Cin) is 0 to 182 as shown in the figure, the small drop size is used. Specifically, in the case where the pixel value is 0, ink ejection is not carried out. Then, in the case where the pixel value is 182, the dot area coverage is set to 100% (255 for 8-bit data) with the small drop size. Moreover, for the pixel value of 0 to 182, the dot area coverage is set to 0% to 100% (0 to 255 for 8-bit data) with the small drop size.

Moreover, in the case where the pixel value (Cin) is 183 to 224, the small drop size and the middle drop size are used. As shown in the figure, the more the pixel value becomes, the less the small drop size is used, and thereby the ratio of the middle drop size is increased. Then, in the case where the pixel value is 225, the dot area coverage is set to 100% (255 for 8-bit data) with the middle drop size.

Further, in the case where the pixel value (Cin) is 226 to 254, the middle drop size and the large drop size are used. As shown in the figure, the more the pixel value becomes, the less the middle drop size is used, and thereby the ratio of the large drop size is increased. Then, in the case where the pixel value is 255, the dot area coverage is set to 100% (255 for 8-bit data) with the large drop size.

As described above, while separately using ink of the small drop size, the middle drop size and the large drop size, the dot area coverage is adjusted, to thereby control the density of the image to be actually formed.

FIG. 9A is a diagram showing an example of the basic dither mask stored in the basic dither mask memory 751. Moreover, FIGS. 9B, 9C and 9D are diagrams each showing an example of the dither mask generated by the dither mask generation section 752, and representing the small drop size dither mask, the middle drop size dither mask and the large drop size dither mask, respectively.

The basic dither mask shown in FIG. 9A has a threshold value pattern of 8 rows and 8 columns. This threshold value pattern is made by randomly arranging 64 integral values randomly selected from the integers of 0 to 255 as the threshold values.

Moreover, the small drop size dither mask shown in FIG. 9B is the dither mask applied to the case where the pixel value is 0 to 182. The small drop size dither mask is normalization of the threshold value pattern shown in FIG. 9A, in which the integers 0 to 255 are changed to the integers 0 to 182. By use of the small drop size dither mask, in the case where the pixel values are 0 to 182, the dot area coverage with the small drop size described with reference to FIG. 8 can be achieved.

Further, the middle drop size dither mask shown in FIG. 9C is the dither mask applied to the case where the pixel value is 182 to 225. The middle drop size dither mask is normalization of the threshold value pattern shown in FIG. 9A, in which the integers 0 to 255 are changed to the integers 182 to 225. By use of the middle drop size dither mask, in the case where the pixel values are 182 to 225, the dot area coverage with the middle drop size described with reference to FIG. 8 can be achieved. It should be noted that, as it can be learned from FIG. 8, the dot area coverage with the small drop size for the pixel values of 182 to 225 is a result of subtraction of the dot area coverage with the middle drop size from 100%.

Then, the large drop size dither mask shown in FIG. 9D is the dither mask applied to the case where the pixel value is 225 to 255. The large drop size dither mask is normalization of the threshold value pattern shown in FIG. 9A, in which the integers 0 to 255 are changed to the integers 225 to 255. By use of the large drop size dither mask, in the case where the pixel values are 225 to 255, the dot area coverage with the large drop size described with reference to FIG. 8 can be achieved. It should be noted that, as it can be learned from FIG. 8, the dot area coverage with the middle drop size for the pixel values of 225 to 255 is a result of subtraction of the dot area coverage with the large drop size from 100%.

The small drop size screen processing execution section 753, the middle drop size screen processing execution section 754 and the large drop size screen processing execution section 755 use the small drop size dither mask, the middle drop size dither mask and the large drop size dither mask, respectively, to thereby carry out screen processing of the image data.

In other words, the pixels of 8 rows and 8 columns are selected and the pixel values thereof are compared with each of the threshold values of the small drop size dither mask, the middle drop size dither mask and the large drop size dither mask. Then, if the pixel value is not less than the threshold value, "1" is outputted, whereas the pixel value is less than the threshold value, "0" is outputted. That is, 1-bit data is outputted.

In the exemplary embodiment, operations of screen processing by the three dither masks are carried out in parallel. Accordingly, the 8-bit image data inputted to the screen processor 75 is outputted as 3-bit image data for each color and each pixel (binary value×3).

<Description of Selector Processor>

The selector processor 76 selects the drop size of ink to be ejected for each pixel. Specifically, selection is made from four types, namely, non-ejection, the small drop size, the middle drop size and the large drop size. Then, the four types are outputted as image data of 0, 1, 2 and 3, respectively. In other words, the image data outputted from the selector processor 76 has 2 bits for each color.

The selector processor 76 selects the drop size of the ink for each pixel based on the image data transmitted from the screen processor 75 and the tag generated by the tag generation section 743.

Specifically, in the case where a pixel is provided with the tag "0" and the pixel is the non-edge pixel, the selector processor 76 makes a selection from the non-ejection, the small drop size, the middle drop size and the large drop size so that the dot area coverage shown in FIG. 8 is achieved with the small drop size, the middle drop size or the large drop size.

On the other hand, in the case where a pixel is the edge pixel provided with the tag "1", "2" or "3", the following process is carried out.

In the case where the tag is "1" or "2" and the pixel exists in the upper edge or the lower edge, the middle drop size is selected without any exception.

Moreover, in the case where the tag is "3" and the pixel exists in the side edge, a process similar to that of the non-edge pixel is carried out.

FIGS. 10A to 10C are diagrams showing changes between images to be formed in a case where the exemplary embodiment is not applied and in a case where the exemplary embodiment is applied.

Of these, the left side of FIG. 10A is similar to FIG. 4B, and shows a case in which vertical cracking occurs in the edge pixels in the lower edge. Then, in the case where the middle drop sizes are set to the edge pixels in the lower edge without any exception by applying the exemplary embodiment, the result is as shown in the right side of FIG. 10A, in which the vertical cracking does not occur in the edge pixels in the lower edge.

Moreover, in a similar manner, the left side of FIG. 10B is similar to FIG. 4C, and shows a case in which vertical cracking occurs in the edge pixels in the upper edge. Then, in the case where the middle drop sizes are set to the edge pixels in the upper edge without any exception by applying the exemplary embodiment, the result is as shown in the right side of FIG. 10B, in which the vertical cracking does not occur in the edge pixels in the upper edge.

It should be noted that in FIGS. 10A and 10B, the large drop sizes are set to the non-edge pixels other than the edge pixels without changes.

In other words, if the module is to be printed entirely with the large drop sizes as shown in FIGS. 4A to 4D, the vertical cracking tends to occur as shown in FIGS. 4B and 4C. In contrast, in FIGS. 10A and 10B, by changing the drop size for the upper edge and the lower edge from the large drop size to the middle drop size, ejection of ink becomes stable, and thereby the vertical cracking is less likely to occur.

It should be noted that, in the case of the side edge, since such a problem of vertical cracking is less likely to occur, the large drop size may be applied. Accordingly, in the case where the edge pixels exist in the side edge, a process similar to that in the case of the non-edge pixel is carried out.

This case can be put another way that, in the case where the pixels constituting the edge portion extend in the direction intersecting the transport direction of the sheet, the process of changing the large drop sizes into the middle drop sizes is applied, and in the case where the pixels constituting the edge portion extend in any direction other than the direction intersecting the transport direction of the sheet, the process of changing the large drop sizes into the middle drop sizes is not applied.

It should be noted that, here, in the case where the edge pixels exist in the upper edge or in the lower edge, the middle drop sizes are selected without any exception; however, the small drop sizes may be selected without any exception, or the middle drop sizes and the small drop sizes may be mixed.

<Description of First Modified Example>

In the above-described example, configurations of the edge processor 74, the screen processor 75 and the selector processor 75 have been described; however, configurations thereof are not limited to the above description.

Here, description will be given of a first modified example.

Figure 11:
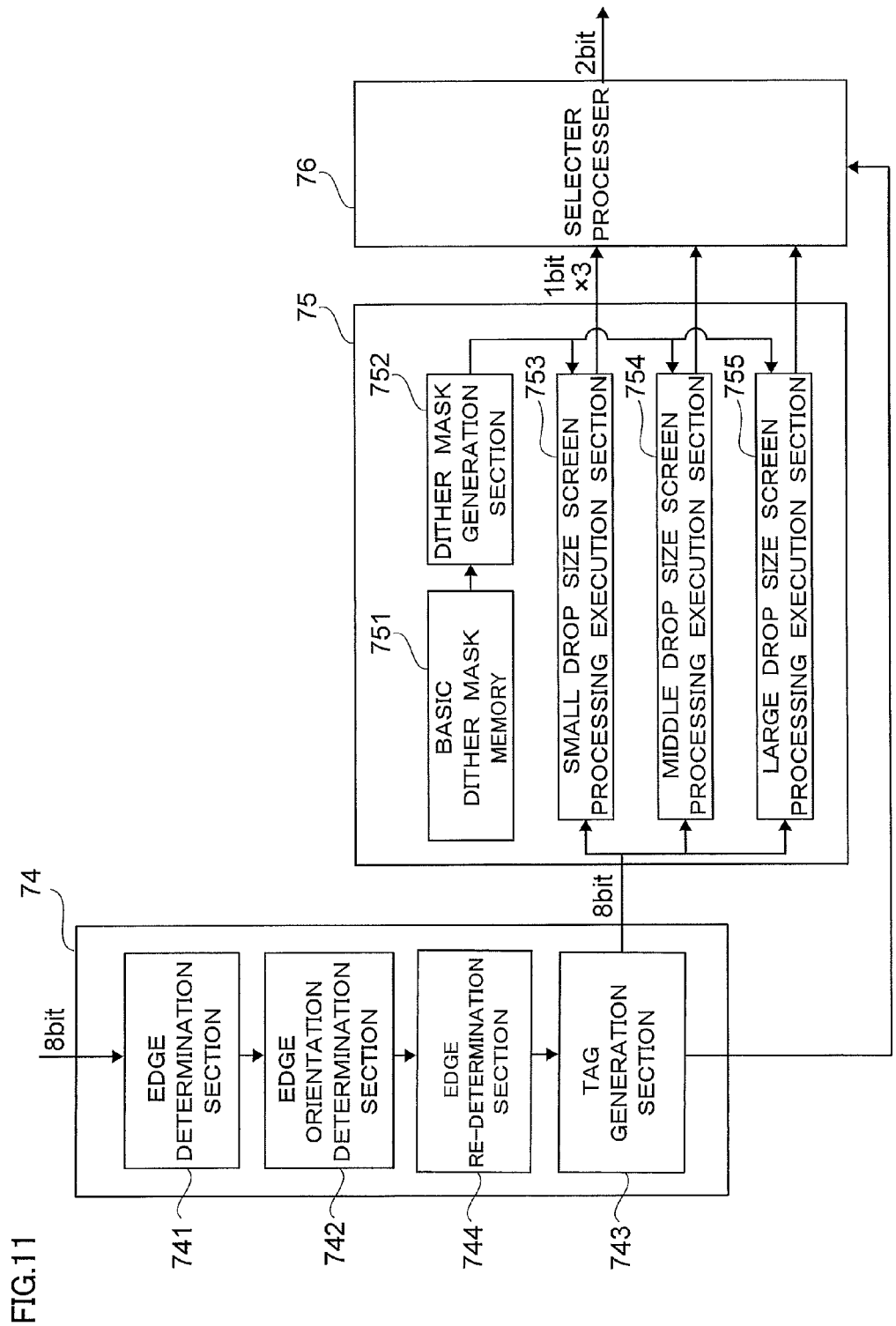
FIG. 11 is a block diagram illustrating a first modified example of the edge processor, the screen processor and the selector processor.

FIG. 11 is a block diagram illustrating the first modified example of the edge processor 74, the screen processor 75 and the selector processor 76.

The configurations of the edge processor 74, the screen processor 75 and the selector processor 76 shown in the figure are similar to those shown in FIG. 5 except a point of difference that an edge re-determination section 744 is added to the edge processor 74. Accordingly, hereinafter, description will be given of the edge re-determination section 744.

The edge re-determination section 744 carries out a process of expanding the pixels constituting the edges.

The edge determination section 741 described with reference to FIG. 5 selects one pixel in the edge portion for determination as the edge pixel. In this case, the middle drop sizes are applied to one row in each of the upper edge and the lower edge as shown in FIGS. 10A and 10B. However, even in this case, stabilization of ink ejection is insufficient depending on device characteristics of the image forming apparatus 1 in some cases.

Accordingly, in this case, the edge re-determination section 744 is provided to carry out a process of expanding the pixels constituting the edge to two pixels or more from the edge portion.

Figures 12A, 12B:
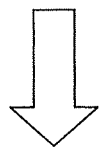
FIGS. 12A and 12B are diagrams showing a case in which the pixels constituting an edge are expanded from one pixel to two pixels by an edge re-determination section.

FIGS. 12A and 12B are diagrams showing the case in which the pixels constituting the edge are expanded from one pixel to two pixels by the edge re-determination section 744.

FIG. 12A shows a case before expanding the pixels constituting the edge, in which determination of the edge pixel is conducted by the edge determination section 741. In the figure, "0" and "1" are the tags provided by the tag generation section 743. In this case, "0" indicates that the pixel is the non-edge pixel. Moreover, "1" indicates that the pixel is the edge pixel and exists in the upper edge.

In this case, the edge re-determination section 744 selects a target pixel T from the pixels, and counts the number of edge pixels around the target pixel T. Then, in the case where the number of counts is not less than a predetermined threshold value, the target pixel T is re-determined as a pixel constituting the edge. The threshold value is set to, for example, 3.

In other words, by determining the target pixel T as the pixel constituting the edge when there are many edge pixels around the target pixel T, the pixels constituting the edge is expanded from the one pixel to the two pixels. It should be noted that the pixels constituting the edge may be expanded to two pixels or more.

FIG. 12B shows a state after re-determination is carried out by the edge re-determination section 744. The pixels constituting the edge are expanded from one pixel to two pixels from the edge portion by the edge re-determination section 744.

In this case, the row to which the middle drop sizes are applied as shown in FIGS. 10A and 10B are expanded from one row to two rows. Accordingly, ink ejection becomes more stabilized and the problem of vertical cracking is less likely to occur.

<Description of Second Modified Example>

Next, description will be given of a second modified example.

Figure 13:
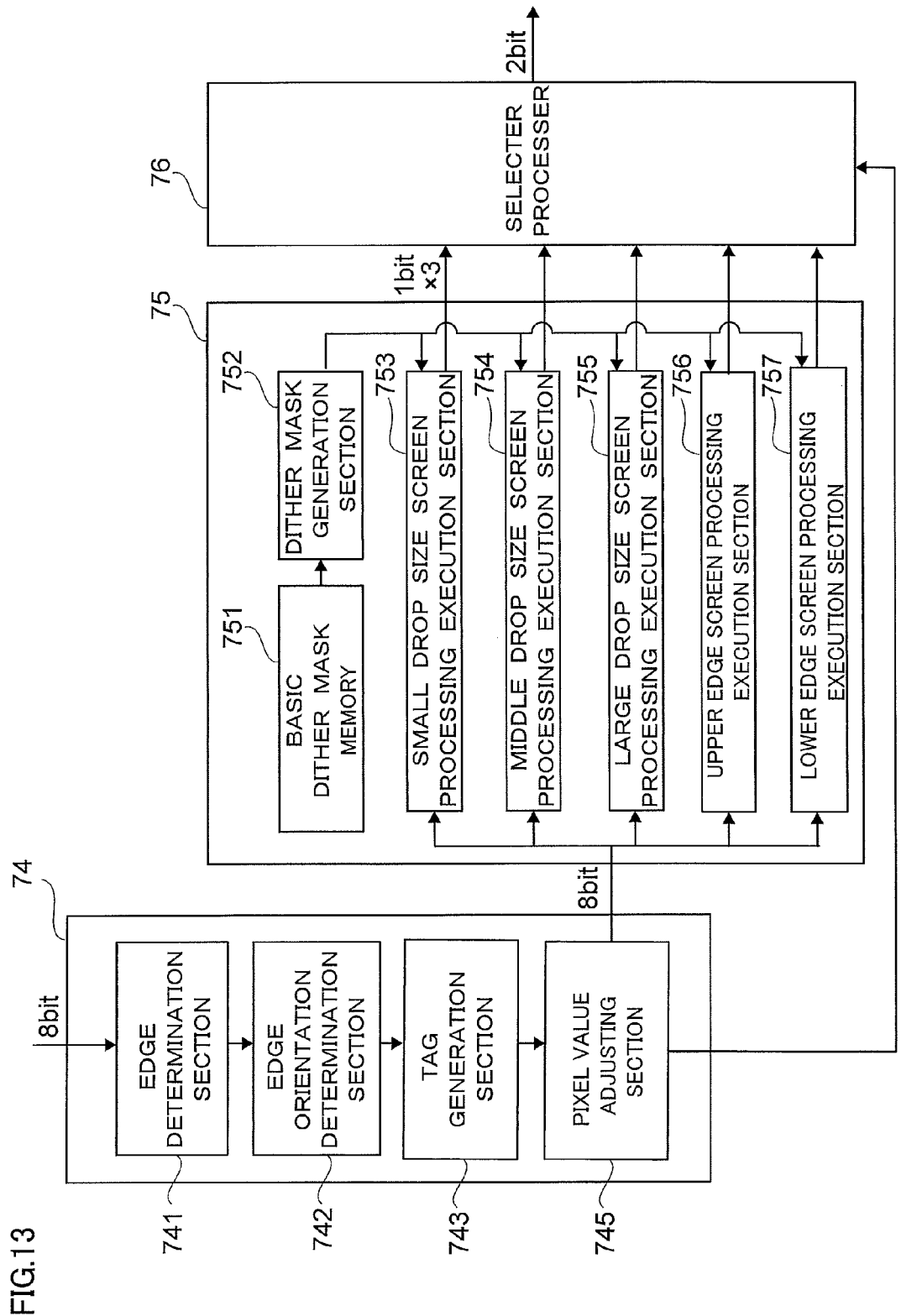
FIG. 13 is a block diagram illustrating a second modified example of the edge processor, the screen processor and the selector processor.

FIG. 13 is a block diagram illustrating the second modified example of the edge processor 74, the screen processor 75 and the selector processor 76.

The configurations of the edge processor 74, the screen processor 75 and the selector processor 76 shown in the figure are different from those shown in FIG. 5 in a point that a pixel value adjusting section 745 is added to the edge processor 74 and in a point that an upper edge screen processing execution section 756 and a lower edge screen processing execution section 757 are added to the screen processor 75.

The pixel value adjusting section 745 carries out a process of reducing a pixel value of an edge pixel.

The pixel value adjusting section 745 reduces a pixel value of an edge pixel by use of, for example, an LUT (Look Up Table).

Figure 14:
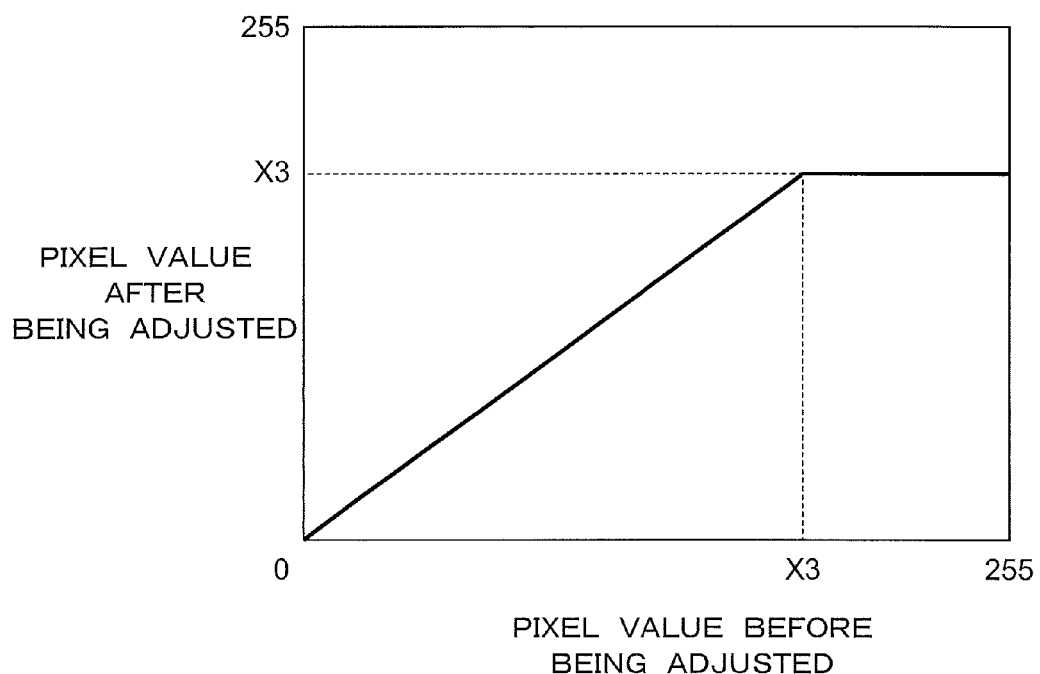
FIG. 14 is a conceptual diagram illustrating an LUT used in a pixel value adjusting section.

FIG. 14 is a conceptual diagram illustrating the LUT used in the pixel value adjusting section 745 at this time. In FIG. 14, the horizontal axis represents the pixel value of the edge pixel when being inputted to the edge processor 74, which is the pixel value before being adjusted, and the vertical axis represents the pixel value after being adjusted.

As shown in the figure, when the pixel value before being adjusted is less than X3, the pixel value after being adjusted is same as the pixel value before being adjusted. However, in the case where the pixel value before being adjusted is not less than X3, the pixel value after being adjusted is maintained constant at X3. The LUT may be same or different between the case of the edge pixels in the upper edge and the case of the edge pixels in the lower edge.

Then, the upper edge screen processing execution section 756 carries out screen processing on the edge pixels in the upper edge, whereas the lower edge screen processing execution section 757 carries out screen processing on the edge pixels in the lower edge. The dither mask used on this occasion is normalization of the threshold value pattern shown in FIG. 9A, in which the integers 0 to 255 are changed to the integers 0 to X3. The dither mask is able to be generated from the basic dither mask by the dither mask generation section 752. The dither masks used in the upper edge screen processing execution section 756 and the lower edge screen processing execution section 757 can be the same as long as the LUTs used in the pixel value adjusting section 745 are same between the upper edge and the lower edge. If the LUTs are different between the upper edge and the lower edge, the dither masks are different between the upper edge screen processing execution section 756 and the lower edge screen processing execution section 757.

By the above-described processing, the dot area coverage of the portions corresponding to the edge pixels is reduced. Accordingly, the edge pixels, which have been printed, for example, with the middle drop sizes as shown in FIGS. 10A to 10C, are printed with the middle drop sizes and the small drop sizes, or the small drop sizes only. As a result, ink ejection becomes more stabilized and the problem of vertical cracking is less likely to occur.

<Description of Operations of the Edge Processor, the Screen Processor and the Selector Processor>

Next, a series of operations of the edge processor 74, the screen processor 75 and the selector processor 76 will be described. Here, description will be given of the case that has been described with reference to FIG. 5, and the modified examples of FIGS. 11 and 13 will be provided with supplemental remarks.

Figure 15:
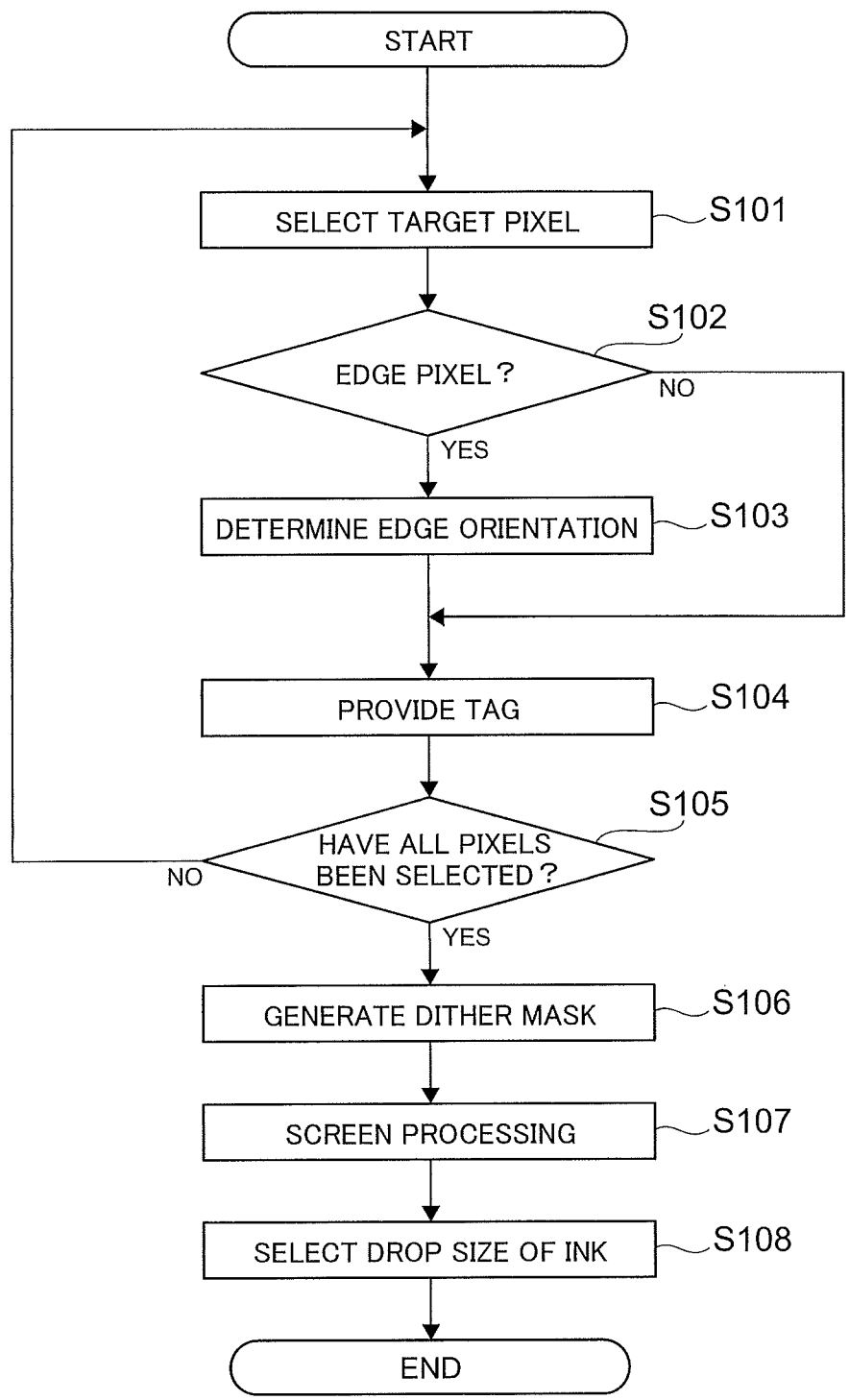
FIG. 15 is a flowchart illustrating operations of the edge processor, the screen processor and the selector processor.

FIG. 15 is a flowchart illustrating operations of the edge processor 74, the screen processor 75 and the selector processor 76.

First, the edge determination section 741 of the edge processor 74 selects a target pixel from the pixels (step 101).

Next, the edge determination section 741 makes a determination whether the target pixel is the edge pixel or the non-edge pixel by the method described with reference to FIGS. 6A and 6B (step 102).

Then, in the case where the target pixel is the non-edge pixel (No in step 102), the process proceeds to step 104.

Moreover, in the case where the target pixel is the edge pixel (Yes in step 102), the edge orientation determination section 742 determines the edge orientation with respect to the edge pixel by the method described with reference to FIGS. 7A to 7D (step 103).

It should be noted that, in the case where the edge re-determination section 744 is provided as in the first modified example, the edge re-determination is carried out after step 103. Moreover, in the case where the pixel value adjusting section 745 is provided as in the second modified example, adjustment of the pixel value is carried out with respect to the edge pixel after step 103, in a similar manner.

Then, the tag generation section 743 provides a tag of "0", "1", "2" and "3" in the cases of the target pixel being the non-edge pixel, the target pixel being the edge pixel and existing in the upper edge, the lower edge and the side edge, respectively (step 104).

Then, the edge determination section 741 determines whether or not all of the pixels have been selected as the target pixels (step 105).

In the case where there is any pixel left unselected (No in step 105), the process returns to step 101, and a new target pixel is selected and determined to be the edge pixel or to be the non-edge pixel.

On the other hand, in the case where all of the pixels have been selected (Yes in step 105), the dither mask generation section 752 of the screen processor 75 generates three dither masks from the basic dither mask stored in the basic dither mask memory 751 (step 106). These three dither masks are the small drop size dither mask, the middle drop size dither mask and the large drop size dither mask described above. It should be noted that, in the case of the second modified example, a dither mask for the upper edge and a dither mask for the lower edge are further generated.

Then, the small drop size screen processing execution section 753, the middle drop size screen processing execution section 754 and the large drop size screen processing execution section 755 carry out screen processing by use of these dither masks in parallel (step 107). It should be noted that, in the case of the second modified example, the upper edge screen processing execution section 756 and the lower edge screen processing execution section 757 further carry out screen processing on the edge pixels.

Next, the selector processor 76 makes a selection of the drop size of the ink for each pixel from the four types, namely, the non-ejection, the small drop size, the middle drop size and the large drop size based on the image data and the tag generated by the tag generation section 743 (step 108), and outputs image data of 0, 1, 2 or 3 corresponding to the selection result.

Moreover, in the above-described example, description has been given of the so-called one-dimensional bar code; however, application of the above configuration is not limited thereto. For example, the above-described configuration is also applicable to the two-dimensional bar code, such as a QR Code (registered trademark). For example, in the case of the QR Code, the above-described configuration is applied to an upper edge and a lower edge of a minimum unit cell (module) constituting a symbol of a QR Code. Accordingly, also in the QR Code, ink ejection becomes stabilized and the problem of vertical cracking is less likely to occur.

Moreover, in the above-described example, the edge determination section 741 determines whether the target pixel is the edge pixel or the non-edge pixel regardless of whether or not the target pixel constitutes a bar code image. However, it is possible to make an alteration so that whether or not an image is a bar code image is determined first, and the process as described above is applied to the bar code image, and is not applied to an image other than the bar code image.

In other words, a process to reduce a drop size of ink to be used for pixels constituting edge portions in the bar code image as compared to a drop size of ink to be used for pixels constituting the other portions may be carried out. Accordingly, it is possible to cause the edge determination section 741 to determine whether or not an image is a bar code image first, and to carry out the process as described above onto the bar code image, and does not carry out the process onto an image other than the bar code image.

To determine whether or not an image is a bar code image, for example, in the case where an image is included in the image data, determination may be such that bar code image information is included in the image data when edges of a predetermined number or more each having a predetermined length or more extending in the vertical direction or the horizontal direction are included in the image.

Further, in the above-described first modified example, the case in which the edge pixels are expanded is shown; however, depending on characteristics of the marking engine, the intrinsic edge pixels may be handled as the non-edge pixels conversely. In other words, in this case, the tags provided by the tag generation section 743 are rewritten from "1", "2" and "3" into "0" according to predetermined conditions in some cases. It should be noted that, accordingly, in the edge portion of the bar code module, for example, the middle drop sizes and the large drop sizes are mixed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

APPENDIX

Japanese Patent Application Laid-Open Publication No. 2006-293916 discloses a program in which a bar code data generation part of a computer generates print data of a bar code on the basis of image data including bar code information, a direction detection part detects a direction of bars of the bar code of the print data, a dot correction part subjects the print data to dot correction processing based on a relation between the direction of bars of the bar code and a development direction, and the corrected print data is outputted to a printer to print the bar code on a recording sheet.

What is claimed is:

1. An image forming apparatus comprising:
    an image forming unit that forms an image on a recording material by ejecting ink; and
    an image processing unit that, in a case where information of a bar code image is included in image information for forming the image by the image forming unit, carries out a process of making a drop size of the ink used for pixels constituting an edge portion in the bar code image smaller than a drop size of the ink used for pixels constituting a portion other than the edge portion, and that expands the pixels constituting the edge portion to two pixels or more from the edge portion.

2. The image forming apparatus according to claim 1, wherein
    the image processing unit carries out the process in a case where the pixels constituting the edge portion extend in a direction intersecting a transport direction of the recording material, and does not carry out the process in a case where the pixels constituting the edge portion extend in any direction other than the direction intersecting the transport direction of the recording material.

3. The image forming apparatus according to claim 1, wherein
    the image processing unit carries out a process of reducing a pixel value of each of the pixels constituting the edge portion.

4. The image forming apparatus according to claim 2, wherein the image processing unit carries out a process of reducing a pixel value of each of the pixels constituting the edge portion.

5. An image processing device comprising:

an image information obtaining section that obtains image information for forming an image by an image forming unit that forms an image on a recording material by ejecting ink;

a drop size selection section that, in a case where bar code image information is included in the image information, carries out a selection for making a drop size of the ink used for pixels constituting an edge portion in the bar code image smaller than a drop size of the ink used for pixels constituting a portion other than the edge portion; and an edge processor that expands the pixels constituting the edge portion to two pixels or more from the edge portion.

6. An image forming method comprising:

forming an image on a recording material by ejecting ink; and in a case where information of a bar code image is included in image information used for forming the image, carrying out a process of making a drop size of the ink used for pixels constituting an edge portion in the bar code image smaller than a drop size of the ink used for pixels constituting a portion other than the edge portion, and expanding the pixels constituting the edge portion to two pixels or more from the edge portion.

\* \* \* \* \*